United States Patent
Siebert et al.

[15] 3,667,349
[45] June 6, 1972

[54] SEAL FOR PISTON-CYLINDER ASSEMBLY

[72] Inventors: Hans Joachim Siebert, Gersthofen, Germany; Gregorius Theodorus Maria Neelen, Emmasingel, Eindhoven, Netherlands

[73] Assignee: U.S. Philips Corporation, New York, N.Y.

[22] Filed: Aug. 24, 1970

[21] Appl. No.: 66,354

[52] U.S. Cl. ................................. 92/83, 92/98 RD, 60/24
[51] Int. Cl. .................................... F01b 19.02, F16j 3/00
[58] Field of Search ...................... 92/83, 98 RD, 98; 60/24

[56] References Cited

UNITED STATES PATENTS

| | | |
|---|---|---|
| 3,302,392 | 2/1967 | Fokker et al...............................60/24 |
| 3,559,398 | 2/1971 | Meijer et al................................60/24 |
| 3,547,005 | 12/1970 | Vander.......................................92/83 |
| 3,492,813 | 2/1970 | Meijer.........................................60/24 |

Primary Examiner—Martin P. Schwadron
Assistant Examiner—Clemens Schimikowski
Attorney—Frank R. Trifari

[57] ABSTRACT

A seal for use with a piston rod and a cylinder assembly or subassembly, where an annular space between the piston rod and cylinder is separated by a sleeve into two annular spaces. The sleeve is axially fixed but radially movable relative to the cylinder, and radially fixed but axially movable relative to the rod, with a rolling diaphragm seal secured between the sleeve and rod.

6 Claims, 2 Drawing Figures

SEAL FOR PISTON-CYLINDER ASSEMBLY

The invention relates to a seal between a rod and an element surrounding said rod, which are reciprocable one relative to the other, in particular a seal between the piston rod and the displacer rod movable therein of a hot-gas reciprocating engine. The seal comprises at least one liquid-supported rolling diaphragm which separates a gas space from a space containing the supporting liquid, with means for maintaining across the rolling diaphragm a pressure differential which is always substantially constant.

Seals of the above-described type are known and are used in all those cases in which a hermetic seal of the gas space is desirable. This is the case, for example, in hot-gas reciprocating engines in which, on the one hand leaking away of medium from the working space should be prevented, and on the other hand supply of lubricating liquid to the working space should be suppressed. The liquid-supported rolling diaphragm readily fulfills these two requirements. The rolling diaphragm, although only very thin, can nevertheless seal against high pressures due to the liquid support. Means are present which maintain a constant differential pressure of a few atmospheres across the rolling diaphragm. As a result of this the rolling diaphragm will not be subjected to length variations so that a long, life of the rolling diaphragm is ensured.

The rolling diaphragm is accommodated in a gap between the rod and the element surrounding rod. It has been found to be of extreme importance for a long life of the rolling diaphragm, that the annular gap in which the rolling diaphragm is accommodated should have the same width throughout its circumference. When the gap width is locally larger than in other places, the stress in the rolling diaphragm as a result of the pressure differential prevailing across the rolling diaphragm will be larger at those places than elsewhere, so that the rolling diaphragm is more expanded there which will soon give rise to fracture. In order to have a uniform gap width, the rod and the housing or other elements surrounding said rod should be arranged truly concentrically relative to each other.

Particularly in those cases in which both the rod and the surrounding element are movable and are guided in different places in the device of which they form part, the concentricity of the rod and the surrounding element will no longer be ensured as a result of tolerance build-up, eccentric connection or by eccentric detrition of the rod and the surrounding element. This occurs in particular in hot-gas reciprocating engines of the displacer type in which the displacer rod is reciprocable in the piston rod and a rolling diaphragm seal is used in the gap between said rods. The piston rod is guided at one end in a passage through the wall of the working space and at the other end by the piston in the cylinder. The displacer rod is guided at one end in the piston rod and at the other end by the displacer in the cylinder. It will be obvious that in such a construction it can easily occur, due to the above causes, that the displacer rod is not truly concentrically guided in the piston rod.

It is the object of the invention to provide a solution to the above problem and to provide a seal between a rod and a surrounding element in which the rolling diaphragm, which is present between the rod and the element, always rolls along surfaces which are truly concentrically arranged relative to each other.

In order to realize this object, the new seal includes a sleeve which may be constructed from several parts, is arranged around the rod and engages said rod in a centering manner in two places which are the inside diameter of the sleeve between said two places is larger than the outside diameter of the rod, and a rolling diaphragm is provided in the resulting gap between the sleeve and the rod. The sleeve is incorporated in the element surrounding the rod in such manner that, in the axial direction, the sleeve is substantially not movable relative to said element and, in the radial direction, it has some play relative to said element. At least one further seal is present between the outer surface of the sleeve and the inner surface of the element facing the sleeve.

Since the sleeve itself engages the rod in a centering manner, eccentricity, if any, between the rod and the element is of no importance, thus ensuring a width of the gap in which the rolling diaphragm is operative which is uniform throughout the circumference. This enhances the reliability and life of the seal.

Since the sleeve is stationary relative to the surrounding element, the seal between the sleeve and the element may be obtained, for example, by means of O-rings or other packing-like seals.

In a favorable embodiment, however, the further seal is also formed by a liquid-supported rolling diaphragm which ensures an hermetic seal. Eccentricity, if any, of the sleeve and surrounding element relative to each other, in this case plays a less important part because the rolling diaphragm in this seal is not continuously rolling.

A further favorable feature of this embodiment is when all the gas spaces and also all the liquid spaces of the gas and liquid spaces separated from each other in pairs by rolling diaphragms and associated with the seal, communicate with each other. This provides a considerable saving of means which are necessary to control the constant pressure differential across the rolling diaphragm.

BRIEF DESCRIPTION OF THE DRAWINGS

In order that the invention may readily be carried into effect, it will now be described in greater detail, by way of example, with reference to the accompanying drawings, in which FIG. 1 diagrammatically shows, not to scale, a part of a hot-gas engine mainly comprising the piston with piston rod and displacer rod.

DESCRIPTION OF THE PREFERRED EMBODIMENT

Figure 1:
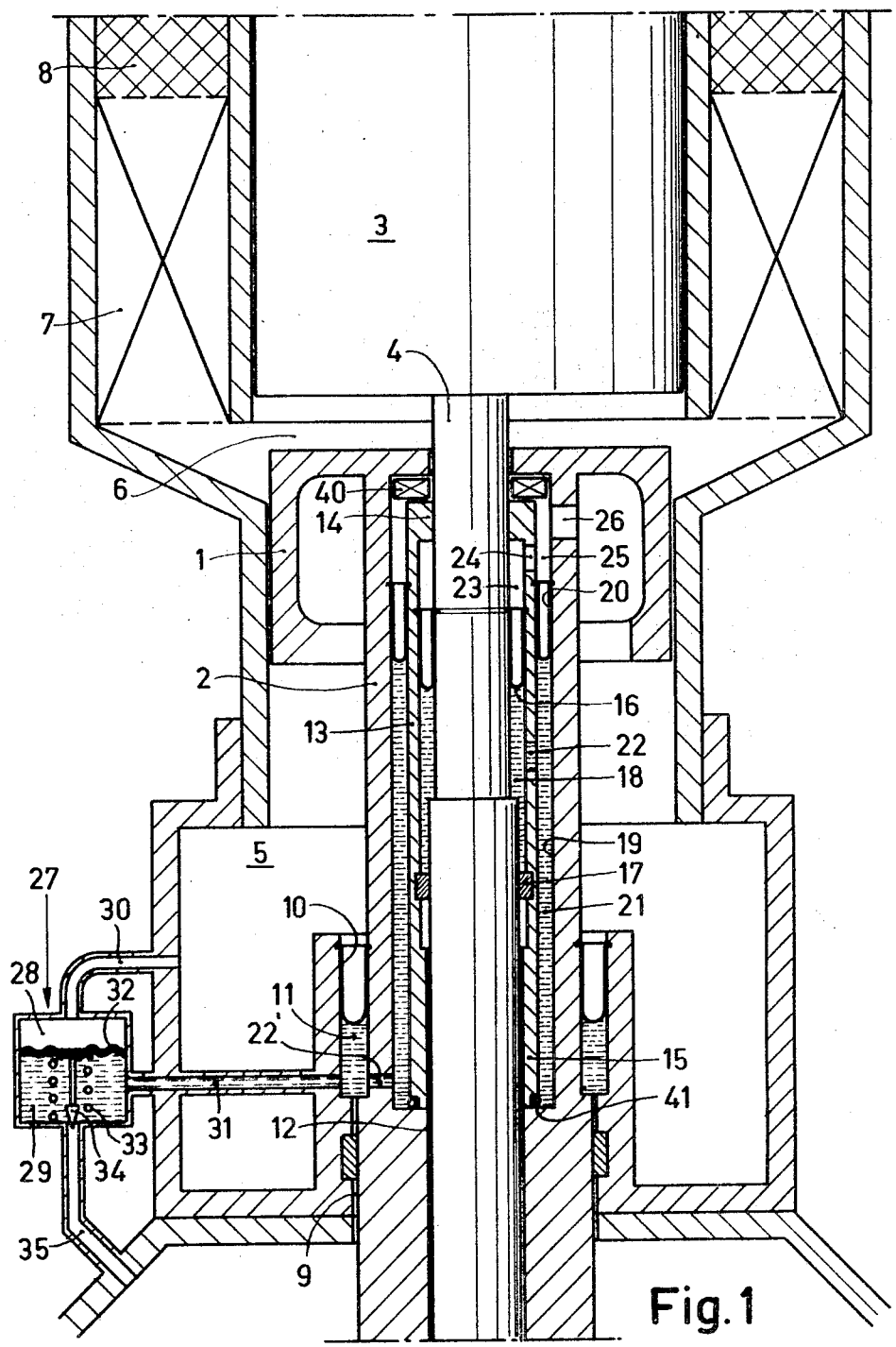

Reference numeral 1 denotes a piston which is connected to a driving mechanism (not shown) by means of a piston rod 2. Reference numeral 3 denotes a displacer which is also connected to the driving mechanism (not shown) via a displacer rod 4. Below the piston 1 there is a buffer space 5 of such a volume that the medium present therein experiences substantially no pressure variations as a result of the volume variations by the piston 1. Between the piston 1 and the displacer 3 there is a compression space 6 which is connected, through a cooler 7 and a regenerator 8 which is partly shown and a heater which is not shown, to an expansion space which is likewise not shown above the displacer 3.

At the area 9, the piston rod 2 is guided at one end in the wall of the buffer space 5, and at the other end by the piston 1 in its cylinder. The seal between the piston rod 2 and the wall of the buffer space is constituted by a rolling diaphragm 10 which is supported by liquid in the space 11.

The displacer rod 4 is passed through the piston rod 2. The displacer rod 4 is guided at one end at the area 12 in the piston rod, and at the other end by the displacer 3 in the cylinder. It will be obvious that it is extremely difficult to arrange the displacer rod 4 accurately centrically in the piston rod. Consequently when a rolling diaphragm is arranged in a gap between the piston and displacer rods, the rolling diaphragm will be loaded more heavily locally than in other places, which adversely influences its life. In order to prevent this the following measures have been taken.

The displacer rod 4 is surrounded by a sleeve 13 which at 14 and 15 is centered directly on the displacer rod. Between the centered places 14 and 15, the inside diameter of the sleeve 13 is larger than the diameter of the displacer rod 4. In the resulting gap a rolling diaphragm 16 is provided. The sleeve 13 furthermore supports a liquid supply ring 17 which supplies liquid to the space 18 below the rolling diaphragm 16. The sleeve 13 is incorporated in a recess 19 in the piston rod 2 and enclosed therein by a pressure ring 40 in such manner that the sleeve 13 is not axially movable movement relative to the piston rod. The outside diameter of the sleeve 13 is smaller than the diameter of the recess 19. A rolling diaphragm 20 as a further seal is provided in the gap between the sleeve 13 and the piston rod 2. The space 21 below the rolling diaphragm 20 communicates, via an aperture 22, with the liquid space 18 below the rolling diaphragm 16 and, via an aperture 22', said space also communicates with the space 11 below the rolling diaphragm 10. An O-ring seal 41 ensures that no liquid can leak away from the space 21.

The space 23 above the rolling diaphragm 16 communicates, via an aperture 24, with the space 25 above the rolling diaphragm 20, which space in turn communicates with buffer space 5 via aperture 26. Thus the same pressure prevails in the gas spaces above the rolling diaphragms 10, 16 and 20, and hence the same pressure can also prevail in the liquid spaces 18, 21 and 11. This means that the pressure differential across the relative rolling diaphragms can be controlled by means of one control device 27. This control device 27 comprises two spaces 28 and 29 the former of which communicates via the duct 30, with the buffer space 5, and the latter of which communicates via duct 31, with the liquid space 11. The two spaces 28 and 29 are separated by a diaphragm 32 which is spring-loaded by a spring 33 and supports a valve 34 which more or less releases the liquid outlet duct 35.

It will be obvious that, as a result of the direct centering of the sleeve 13 on the displacer rod 4, the rolling diaphragm 16 is now operative in an annular gap which will show the same width everywhere as accurately as possible. Thus, the danger of local sagging of the rolling diaphragm is fully avoided. The gap in which the rolling diaphragm 20 is operative may show some variation in width but since the sleeve 13 and the piston rod 2 are not movable relative to each other, the rolling diaphragm 20 is stationary so that the difference in gap widths is far less serious to the life of the diaphragm.

Although the invention has been described with reference to the seal between a piston rod and a displacer rod in a hot-gas engine, it will be obvious that the seal according to the invention can be applied with the same advantage in all those cases in which the centering of the rod and the housing surrounding said rod presents difficulties.

Figure 2:
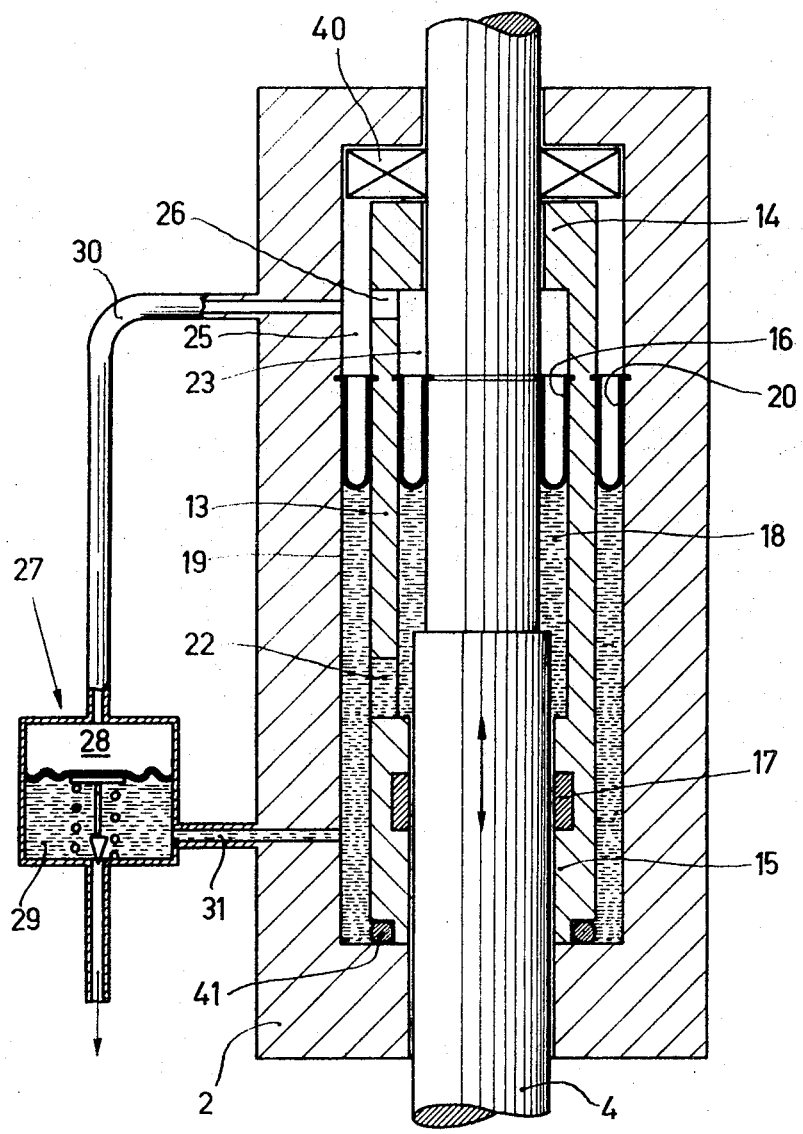
FIG. 2 shows diagrammatically a seal between a movable rod and the surrounding housing.

FIG. 2 shows the seal again in its simplest form in which the components are referred to by the same reference numerals as in FIG. 1 as much as possible. A rod 4 is movable in a housing 2. A sleeve 13 is directly centered on the rod at the areas 14 and 15. A rolling diaphragm 16 which separates a gas space 23 from a liquid space 18 is provided in the gap between the sleeve 13 and the rod 4. Liquid is supplied to the space 18 by a supply ring 17. The sleeve 13 is incorporated in a recess 19 in the housing 2 and enclosed in said recess by a closing ring 40 in such manner that the sleeve cannot perform an axial movement relative to the housing. In the gap between the sleeve 13 and the housing 2, a rolling diaphragm 20 is provided which separates the gas spaces 25 from the liquid space 18. The two gas spaces 23 and 25 communicate with each other through aperture 26 and communicate with the space 28 in the control device 27 through duct 30. The liquid spaces 18 and 19 also communicate with each other through aperture 22 and communicate with space 29 in the control device 27 via the duct 31.

After the above explanation, the operation of this device will be clear. It is ensured in this case also that the rolling diaphragm 16 is operative at all times in a gap the width of which is the same everywhere.

What is claimed is:

1. In a hot gas reciprocating engine including an axially movable piston with extending piston rod having a bore therethrough, and a displacer rod axially movable within said piston rod bore, the improvement in combination therewith of seal means between said rods, wherein the rods engage each other at two axially spaced areas with an annular gap defined between them, the seal comprising a sleeve disposed in said gap such as to define inner and outer annular spaces between the sleeve and the displacer rod and the piston rod respectively, the ends of the sleeve engaging the piston rod and axially fixed but radially movable thereto, the sleeve engaging the displacer rod snugly to be centered therewith, a first rolling diaphragm seal secured between said sleeve and the displacer rod, and a further seal means secured between said sleeve and the piston rod, whereby said rolling seal remains substantially centered relative to the displacer rod.

2. Apparatus according to claim 1 wherein said further seal means comprises a rolling diaphragm.

3. Apparatus according to claim 1 further comprising means for maintaining substantially constant pressure differential across said first rolling seal.

4. In an apparatus including an axially movable piston with extending piston rod having a bore therethrough, and a second rod axially movable within said piston rod bore, the improvement in combination therewith of seal means between said rods, wherein the rods engage each other at two axially spaced areas with an annular gap defined between them, the seal comprising a sleeve disposed in said gap such as to define inner and outer annular spaces between the sleeve and the second rod and the piston rod respectively, the ends of the sleeve engaging the piston rod and axially fixed but radially movable thereto, the sleeve engaging the second rod snugly to be centered therewith, a rolling diaphragm seal secured between said sleeve and the second rod, and a further seal means secured between said sleeve and the piston rod, whereby said rolling seal remains substantially centered relative to the second rod.

5. In a hot gas reciprocating engine including an axially movable piston with extending piston rod having a bore therethrough, and a displacer rod axially movable within said piston rod bore, the bore having two axially spaced contact areas with inner diameter corresponding closely to the outer diameter of the displacer rod, and a central of greater inner diameter between said contact areas, thus an annular gap defined between said rods, the seal comprising a sleeve disposed in said gap such as to define inner and outer annular spaces between the sleeve and the displacer rod and the piston rod respectively, the ends of the sleeve engaging the piston rod and axially fixed but radially movable thereto, the sleeve engaging the displacer rod snugly to be centered therewith, a rolling diaphragm seal secured between said sleeve and the displacer rod, and a further seal means secured between said sleeve and the piston rod, whereby said rolling seal remains substantially centered relative to the displacer rod.

6. Apparatus according to claim 1 further comprising a pumping ring secured between said sleeve and displacer rod axially spaced from said first rolling seal.

* * * * *